Sept. 24, 1929.  E. F. LUNDEEN  1,729,429
ELECTROLYTIC RECTIFIER
Filed April 14, 1927
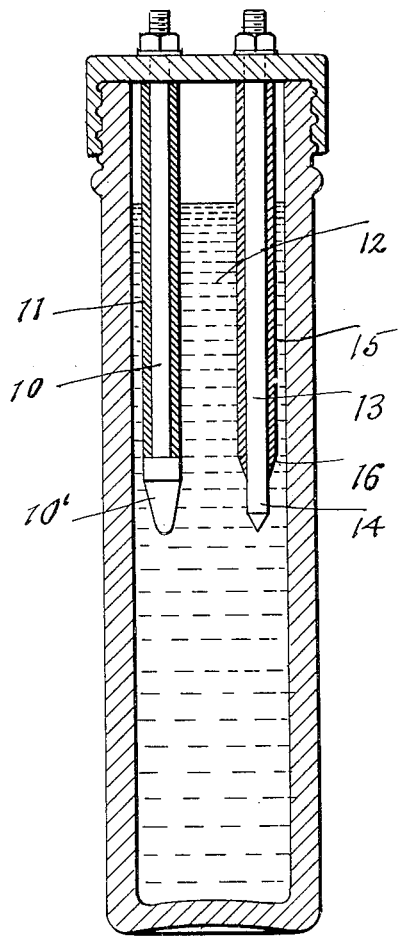
Inventor
Ernest F Lundeen
By Kroe Hudson & Kent
Attorneys Patented Sept. 24, 1929

1,729,429

UNITED STATES PATENT OFFICE

ERNEST F. LUNDEEN, OF CLEVELAND HEIGHTS, OHIO, ASSIGNOR TO WILLARD STORAGE BATTERY COMPANY, OF CLEVELAND, OHIO, A CORPORATION OF WEST VIRGINIA

ELECTROLYTIC RECTIFIER

Application filed April 14, 1927. Serial No. 183,822.

This invention relates to electrolytic cells, particularly rectifier cells, and has special reference to the structure and method of treating the aluminum film-forming electrode.

The principal object of the present invention is to provide certain improvements which will increase the voltage required to break down the film of the aluminum electrode and which will provide greater uniformity in the breakdown voltage for different cells than exists at the present time.

The breakdown voltage of an electrolytic rectifier cell has in a measure been a limiting factor in the utility of electrolytic cells for rectification purposes, for, as is well known, the higher the voltage of the rectified current the greater the number of electrolytic cells required, and this frequently introduced a cost element or factor which prevented the use of rectifiers of this type. Obviously, therefore, an improvement which increases the breakdown voltage increases the utility of cells of this kind, especially when adapted to be used under relatively high voltage conditions.

I have found, as a result of a great deal of experimentation, that by a given treatment of the aluminum or film-forming electrode the breakdown voltage can be very materially increased. This treatment consists in treating the electrode by heating it to a high temperature, which I prefer to be 500° F. or above. That is to say, the breakdown voltage is increased markedly when the electrode is heated to a temperature of at least 500° and it is increased somewhat but not to a marked degree by subjecting it to an even higher temperature. However, the chief results are obtained by heating it to a temperature somewhat above 500° F.

The method of cooling is of some little importance, that is, if the electrode is suddenly cooled, as by quenching, a beneficial effect is obtained but the results are much better where cooling is slow, that is, where the electrode is annealed. The heating and cooling should always follow after the electrode has been formed into its final shape.

I do not know with certainty just why this treatment improves the electrode in so far as the breakdown voltage is concerned, but I believe it is due to the fact that it reduces the amount of amorphous metal and increases the amount of crystalline metal in the electrode. This conclusion or theory is borne out by the fact that my improvement is particularly efficacious when employed in connection with an electrode which has been cold-worked or shaped, as by a heading or upsetting process, which is known to increase the amorphous metal. For example, I find that an electrode upon which a small amount of cold-work has been done may show a breakdown voltage of approximately 160 volts D. C., while in the case of one upon which a comparatively great amount of cold-work has been done the breakdown voltage may be as low as 140 volts, and when either one of these electrodes is treated in accordance with my invention, that is, by being heated to 500° F. or over and cooled slowly, the breakdown voltage may be increased to approximately 180 volts.

I might say in explanation that these breakdown voltages are conveniently determined in the following manner: A rectifier cell whose breakdown voltage is to be determined is connected to a D. C. line in such a way that it resists the passage of current, i. e., the film-forming electrode is connected to the positive side of the line. A voltmeter across the rectifier measures the voltage impressed and an ammeter indicates the current flowing in milliamperes. Starting with a voltage which the film will stand and then increasing this voltage, a point will be reached where the film will break, this being known as the D. C. breakdown voltage. Experience has shown that these results are comparable with the results obtained when alternating current is impressed on the electrodes and a conventional filter circuit is used.

A suitable non-film-forming electrode, such as lead or iron, may be employed with my improved film-forming electrode, and with these electrodes any suitable electrolyte may be employed, such, for example, as that described in the Carpenter Patent No. 1,600,397, granted September 21, 1926.

I have also found that by the addition of a small amount of potassium dichromate or potassium chromate to the solution described in the Carpenter patent, an increase in the breakdown voltage and also other advantages are obtained, but these improvements in the electrolyte are claimed in a separate application filed of even date herewith.

In the drawing, I have illustrated in a more or less diagrammatic manner a vertical cross section of an electrolytic cell in which the aluminum or film-forming electrode is illustrated at 10, with a small portion 10' at the lower extremity thereof exposed, the balance of the electrode being covered and protected by a sleeve 11 of hard rubber or other material which is impervious to the electrical as well as the chemical action of the electrolyte 12. The other electrode, which I prefer to form of lead, iron or steel, is indicated at 13, and in this case also I expose only the lower extremity 14 to the action of the electrolyte, the remainder of the electrode being covered by a sleeve 15 similar to the sleeve 11, but tapered at 16.

While I have given one theory or explanation as to why my invention, consisting of the heating and cooling of the film-forming electrode, increases the breakdown voltage, that explanation being a change in the physical structure of the electrode by reducing the amount of amorphous metal, I wish it to be understood that while I am aware that this change in the physical structure is brought about by heating, still I am not sure that the desired effects are produced as a result of this physical change. It may be due to some other changed condition of which I am not now aware, but the explanation given above is the one now best known to me.

Having thus described my invention, I claim:

1. The method of increasing the breakdown voltage of an electrolytic cell having a film-forming electrode, which comprises heating the electrode prior to the formation of the film thereon.

2. The method of treating a film-forming electrode of an electrolytic cell which consists in heating the electrode to a temperature of at least 500° Fahrenheit.

3. The method of increasing the breakdown voltage of an electrolytic cell having a film-forming electrode, which comprises heating the electrode prior to the formation of the film thereon and thereafter cooling it slowly.

4. The method of treating a film-forming electrode of an electrolytic cell which consists in heating the electrode to a temperature of 500° Fahrenheit and thereafter cooling it slowly.

5. A film forming electrode for an electrolytic cell, having a homogeneous structure of amorphous and crystalline metal thoroughly intermixed, said electrode containing less than a normal amount of amorphous metal.

6. A film forming electrode for electrolytic cells having a homogeneous structure of amorphous and crystalline metal thoroughly intermixed, said electrode containing an amount of amorphous metal smaller than that resulting from the formation of the electrode.

In testimony whereof, I hereunto affix my signature.

ERNEST F. LUNDEEN.